Dec. 18, 1956 O. J. GERBRACHT 2,774,626
SPRAY PUMP APPARATUS
Filed Aug. 26, 1954
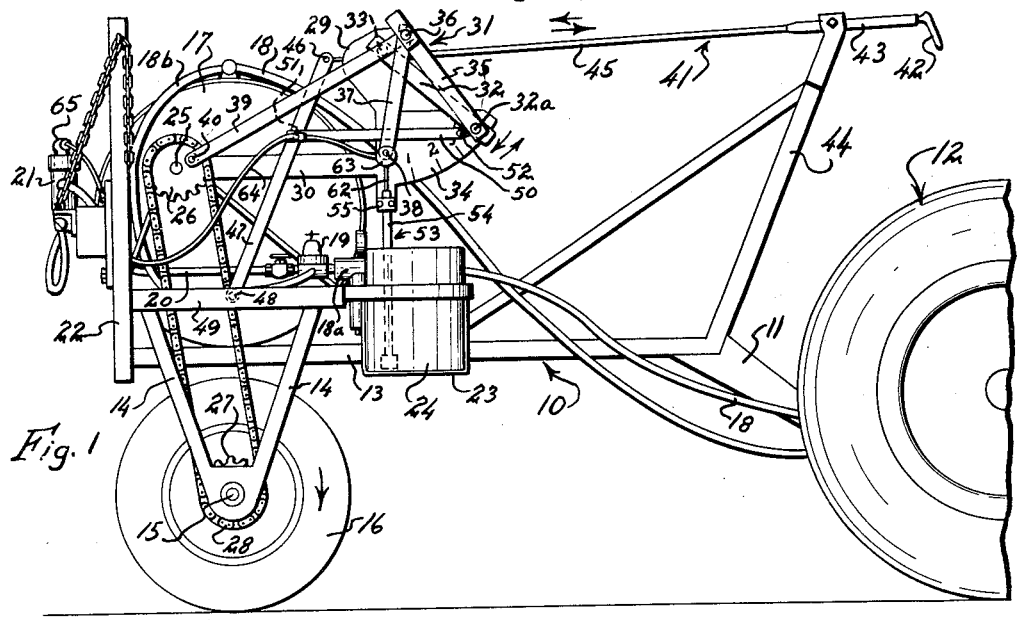
Fig. 1
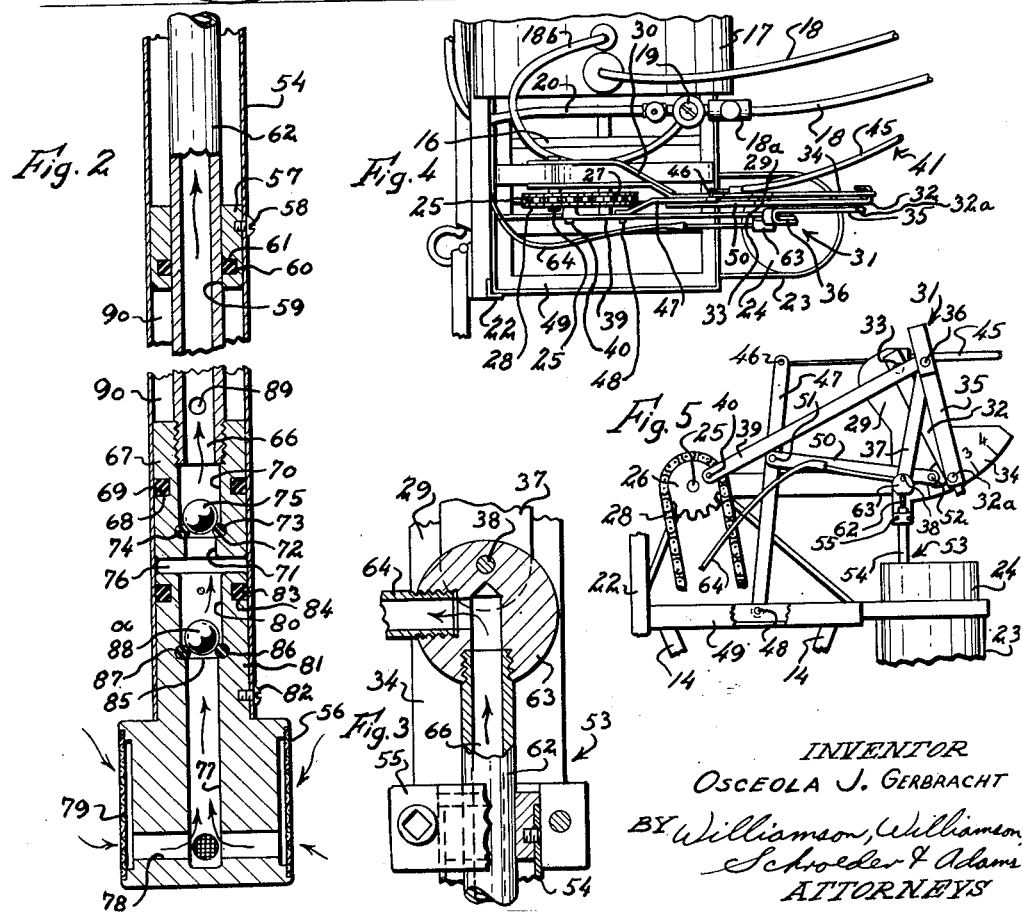
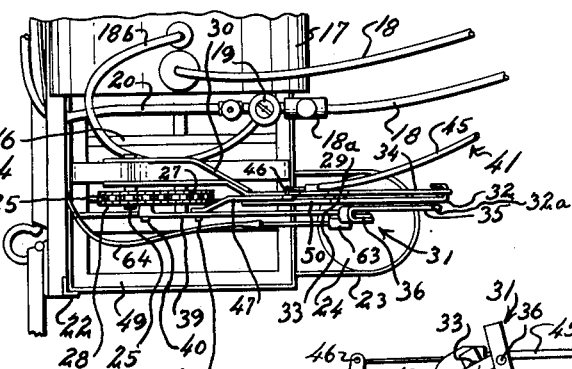
INVENTOR
OSCEOLA J. GERBRACHT
BY Williamson, Williamson,
Schroeder & Adams
ATTORNEYS United States Patent Office 2,774,626
Patented Dec. 18, 1956

2,774,626

SPRAY PUMP APPARATUS

Osceola J. Gerbracht, Hettinger, N. Dak.

Application August 26, 1954, Serial No. 452,255

6 Claims. (Cl. 299—45)

This invention relates to an apparatus for spraying terrain and more particularly to a spray pump apparatus for administering controlled quantities of chemical treatment to plants growing in the ground.

Numerous devices and methods have been proposed for spray treating plants and weeds growing on the ground. There are two main problems which confront the user of such prior equipment. First, where it is desired to vary the amount of spraying liquid to suit the type of plants to be sprayed, no quick and easy method has been devised for accurately changing and controlling the amount of liquid delivered. Secondly, the rate of speed at which the spraying vehicle travels over the ground cannot be held at a constant rate. Consequently, where a predetermined rate of liquid flow is maintained, some portions of the ground will obtain a heavier portion of spraying liquid than others. The problem is further intensified where it is attempted to control the rate of flow through nozzles having pre-set characteristics. For example, if nozzles or spray-heads are designed to deliver a certain quantity of liquid per hour, such quantity should be maintained in order to properly apply the sprayed liquid. The size and direction of the orifices in the spray-heads, the distance separating the spray-heads and the distance from the spray-heads to the ground are all more-or-less fixed with relation to the spraying characteristics of the nozzles. If the rate of flow of liquid is cut down to a fraction of the ideal rate, the amount of ground area covered will be lessened and the concentration of liquid invariably becomes uneven. Thus, where weeds are being treated to selectively kill them while maintaining the healthy growth of desirable plants, such weeds may not receive a sufficient concentration to be effective. On the other hand, those areas receiving too great a concentration will cause not only the weeds to be killed, but also the desirable plants.

I have disclosed a method and form of apparatus which overcomes the above noted difficulties in my prior application for patent, Serial No. 379,935, filed September 14, 1953, and entitled "Apparatus and Method for Spraying Terrain." The present invention contemplates the employment of substantially the same method of spraying as there described but proposes an improved pump structure for accomplishing the purposes therein noted.

It is therefore a general object of this invention to provide a spray pump apparatus which will be efficient and convenient in spraying terrain under conditions which are controllable over a wide range of circumstances.

It is another object of the invention to provide apparatus for delivering a variable but predetermined quantity of active chemical to the terrain and plants growing thereon which will be proportionate to the rate of travel over the ground, all the while preserving ideal spray characteristics of the nozzle assembly.

It is a further object of the invention to provide a self-cleansing pump mechanism in the apparatus described which will be of a double-acting character and provide an even controlled flow of chemical to a mixing valve for intermixing and subsequent spraying through spray nozzles.

It is a further object of the invention to provide a novel control for easily and quickly varying the proportional flow of active chemical for intermixing with the spray vehicle.

It is a still further object of the invention to provide a simple and inexpensive apparatus and pump mechanism therefor which will carry out the method disclosed in my prior application and utilizing directly a standard container bearing liquid chemical such as weed killing solution, the pump mechanism being insertable through the opening thereof and without removing or transferring the contents of the container prior to usage.

These and other objects and advantages of my invention will more fully appear from the following description made in connection with the accompanying drawings, wherein like reference characters refer to the same or similar parts throughout the several views, and in which:

Fig. 1 is a side elevation of my spray apparatus attached to the rear end of a vehicle with the pump mechanism inserted in a standard container of plant treating chemical, the control mechanism being set for maximum stroke of the pump and shown in its uppermost stroke position. Unessential portions of the vehicle are cut away;

Fig. 2 is a vertical section of the chemical pump proper showing the plunger in lowermost position and segmented with unessential portions deleted;

Fig. 3 is an enlarged vertical section with portions in full line showing the local detail of the plunger pivot connection, portions of the view being shown in full line and hidden portions indicated by dotted line configuration;

Fig. 4 is a detailed top plan view of the pump arrangement of Fig. 1; and

Fig. 5 is a detailed view of the pump control mechanism set to a smaller pump structure for a lower proportionate delivery of chemical to the spray nozzles.

With continued reference to the drawing, Fig. 1 shows my spraying apparatus in the form of a wheeled frame structure 10 which is connected through a drawbar 11 to a draft vehicle such as a tractor, the rear portion of which is indicated at 12. The spraying apparatus has a frame structure 13 to which is attached a pair of depending trucks 14 across which an axle 15 is journaled and upon which rubber tired wheels 16 are mounted as shown. The wheeled frame structure 10 also has mounted thereon a supply tank 17 which is adapted to hold a carrying fluid such as water for delivery through a tube 18 which communicates with a pump mechanism (not shown), then passes through a strainer 18a and through regulating valve 19 to supply tube 20. The regulating valve 19 may be adjusted to predetermine the pressure in tube 20, the excess pumped carrying fluid being returned via the line 18b to tank 17. The pressurized carrying fluid or water is then forced through tube 20 to a mixing or proportioning device 21 from which is delivered to spray bars 22, all in accordance with the invention as set forth in my copending application above identified.

The present invention is concerned with the pump mechanism for supplying liquid chemical at a varying rate to the mixer 21 where it is intermixed and delivered along with the carrying fluid from tank 17 to the spray bars 22 for delivery to the terrain as the vehicle 12 pulls the spraying apparatus in a forwardly direction. As explained in my copending application, it is intended that the carrying fluid be delivered at a constant rate so as to control the spray characteristics of the spray bars and nozzles while the liquid chemical such as weed killer is added proportionally to the rate of travel of the device to the carrying vehicle. Thus the faster the vehicle travels, the greater will be the amount of liquid chemical intermixed with the carrying fluid and the net result is to distribute a constant amount of active chemical ingredient per unit area as the spraying apparatus travels along. The invention, of course, contemplates adjusting the rate of delivery of active chemical and the present invention is directed to a special form of pump associated therewith to more efficiently accomplish the objective of this and my previous invention set forth in the above identified application.

A cradle or retaining structure 23 is secured to the frame 10 for retaining in upright position an ordinary conventional can of liquid chemical 24 and preferably a 5-gallon container of the type shown. The container is adapted to be placed in position with its cover removed so as to permit fluid to be drawn upwardly therefrom.

Journaled in the framework 10 is a stub shaft 25 to which is secured a sprocket wheel 26 as shown in Fig. 1. An aligned sprocket wheel 27 is axially mounted on axle shaft 15 and a roller chain 28 drivably interconnects the sprockets so that forward travel of vehicle 12 will cause corresponding rotation of the supporting wheels 16 and clockwise rotation of sprocket 26.

A mounting structure 29 is pivotally secured to the wheeled frame structure 10 and preferably pivotally mounted with respect to the stub shaft 25 through a rearwardly extending arm 30 as shown in Fig. 1.

A variable stroke mechanism 31 is mounted upon the mounting structure 29 and comprises an adjustment arm 32 pivotally secured at 33 to the mounting structure 31 and having its depending end swingable with respect to an arcuate edge 34 of the mounting structure 29. The arcuate portion 34 may have indicia written thereon to indicate the various rates of application of liquid chemical through the pumping mechanism. Adjacent the lower end of adjustment arm 32 at 32a is pivotally secured a radius arm 35, the other end of which radius arm extends upwardly and is pivotally connected at 36 to a link 37 which in turn extends downwardly to connect at the pivot pin 38 with the pump proper which will be presently described. A connecting rod 39 is pivotally secured to one of said radius arm 35 or said link 37 but preferably connected to both at the common pivot point 36, the other end of the connecting rod being secured pivotally to crank pin 40 which in turn forms an abutment on the sprocket wheel 26 as shown.

Means for manually adjusting the variable stroke mechanism 31 is indicated generally at 41 and comprises a handle grip 42 which is slidably received within a sleeve 43 in turn mounted on an upward frame extension 44 which forms a part of the wheeled frame member 10. The handle 42 in turn connects with the reciprocable rod 45 which in turn is pivotally secured at 46 to the arm 47. Arm 47 in turn is pivotally mounted at 48 to the frame 10 at the upper cross brace 49 all as shown in Fig. 1. A link 50 pivotally interconnects an intermediate point 51 on said arm 47 and the adjustment arm 32 at pivot point 52.

The pump proper is indicated generally at 53 and comprises a cylinder 54 as shown in Figs. 1 and 2, together with plunger mechanism, the cylinder 54 being secured in depending relation through bracket 55 on the mounting structure 29. The cylinder 54 has a depending portion which terminates in an enlarged end portion 56 which is adapted to rest on the bottom of container 24 as shown in Fig. 1. The cylinder 54 has an annular collar 57 which fits in fluid-tight relation with the inside of cylinder 54 and is secured thereto through such means as a set screw 58 as shown in Fig. 2. An opening 59 is formed in the collar 57 and has an annular groove 60 formed therein which is adapted to receive an O-ring 61 for maintaining fluid-tight connection with a reciprocating hollow rod or plunger 62. The reciprocating rod 62 terminates at its upper end in a hollow head 63 which in turn is in fluid communication with the fluid line 64. Fluid line 64 in turn connects at 65 with the mixer 21 for the purpose of intermixing the liquid chemical with the carrier fluid as before described. The head 63 is pivotally secured at pivot point 38 to the link 37 for reciprocation thereof as will be presently described. The lower end of the hollow rod or plunger 62 terminates in an externally threaded end 66 which is received within a piston member 67 as shown in Fig. 2. The piston proper has an external groove 68 which receives a resilient O-ring 69 for establishing fluid-tight connection with the inner wall of cylinder 54. The piston 67 also has a longitudinal opening 70 which extends all the way through and the opening is diminished at the lower orifice 71 so as to produce an annular shoulder 72 within the piston as shown. The annular shoulder 72 has an annular grooved area 73 in association therewith for receiving a resilient O-ring 74 upon which a ball check 75 is adapted to seat under normal conditions.

A space 76 exists below the piston 67 and above the lower end 56 as shown in Fig. 2. An inlet passageway 77 is formed medially within the lower end 56 and is provided with a plurality of laterally extending inlet passageways 78 about which a screen member 79 may be positioned so as to strain out undesirable impurities and sediment. The passageway 77 extends upwardly within the cylinder end 56 and communicates with an enlarged portion 80 which in turn communicates with the cylindrical space 76 as shown. The enlarged end 56 may be formed integrally or may be a separate attachable piece as shown in Fig. 2 which is securable at its reduced upper portion 81 by such means as set screw 82 passing through the wall of cylinder 54 and threadably received in the reduced upper end 81. Another O-ring 83 may be positioned in an annular groove 84 at the upper reduced end 81 so as to establish a fluid-tight connection with the internal space 76 within the cylinder 54. The enlarged passageway 80 forms a shoulder 85 and an additional annular groove 86 is formed at the shouldered area so as to receive a resilient O-ring 87 against which is normally seated a ball check 88 as shown. A transverse opening 89 is formed through the hollow rod or plunger member 62 at a point just above the piston 67 so as to establish a continuous fluid communication between the internal space of the plunger 62 and the annular space 90 defined by the inner cylindrical walls 54 and the outer wall of the plunger 62.

In the use and operation of my spraying apparatus, the tank 17 is filled with a carrying fluid such as water and a pump mechanism (not shown) such as may be associated with a tractor 12 is then set in operation so as to pump an excess head of water through the strainer 18a and into the regulating valve 19. Carrying fluid is thus supplied through tube 20 to the mixing valve 21, the excess fluid being returned through line 18b to the supply tank 17. The carrying fluid is distributed through mixing valve 21 and thence to the spray bars 22 from which it is delivered in conventional manner from spray bar 22 and spray nozzles (not shown) to the terrain as required. The spraying characteristics of the carrying fluid thus remains unaltered regardless of the speed at which the spraying apparatus moves over the terrain. The active chemical liquid, however, is proportioned into the constant flow of carrying fluid or water in accordance with the rate of travel over the ground so that a predetermined and uniform amount of chemical will be deposited on the ground or on plants per unit area regardless of the speed at which the spraying apparatus travels. The liquid chemical feed is accomplished by inserting an ordinary commercial spraying liquid container 24 together with its contents in carrying frame 23 which is secured to the main frame structure 10. The pumping mechanism is pivotally raised about the shaft 25 and then lowered so that the pump proper 53 enters the top of the container 24 with its enlarged end extension 56 at or adjacent the bottom of the container 24. It will be noted that all pivot points are so arranged that the pump mechanism can thus be raised without requiring removal of any pins or bolts. Even the connecting arm 50 which is attached to the control rod 41 is properly pivoted at 51 to permit raising and lowering the pumping mechanism.

With the pumping mechanism in the position shown in Fig. 1, the adjusting means 41 is moved by means of handle 42 until adjustment arm 32 is in alignment with the corresponding indicia at the arcuate edge 34 of the mounting structure 29. For convenience, the arcuate edge can be marked in terms of pints of chemical per acre of application. In the drawing in Fig. 1, the adjustment arm is in alignment with Fig. 4 which indicates four pints of chemical per acre. The wheeled vehicle is then pulled forwardly by the draft vehicle 12 to cause the sprocket 27, chain 28 and sprocket 26 to rotate in a clockwise direction. The eccentric crank pin 40 on sprocket 26 causes the connecting rod 39 to reciprocate for a constant distance and thereby oscillates the radius arm 35 through a constant arc. Link 37 thus moves upwardly and downwardly and causes the plunger 65 to pump chemical from the container 24 at each stroke, whether in an upward or downward direction, through the fluid supply line 64 and through the inlet 65 of the mixer 21 where the chemical is intimately mixed with the water prior to spraying from spray bars 22. If the vehicle 12 moves more rapidly, the pump 53 will be operated more rapidly so as to inject a proportionate amount of chemical into the mixer 21 for distribution from the spray bars 22. If it is desired to vary the amount of liquid chemical which is intermixed with the water, the adjusting means 41 may be moved so as to shift the position of adjustment arm 32, thus bringing the pivot point 32a closer to the pivot point 38 when the rod 45 is moved rearwardly. It will be observed that the arc through which the upper end of radius arm 35 swings will remain the same, but since the pivot point 32a is closer to pivot point 38, the vertical component will be less and hence the upward and downward stroke of plunger 62 will be diminished. Again a constant application of chemical liquid per unit area will be applied to the terrain regardless of the speed of vehicle 12. The constant amount applied will, of course, be less per acre than it was in the first instance. If it is desired to completely interrupt the application of chemical for short periods, the water pump may continue to operate but pivot pin 32a can be brought completely into alignment with the pivot pin 38, in which case the radius arm merely oscillates concurrently with the link 37 and without causing any reciprocation of plunger 62.

Referring now to the operation of the pump itself, the plunger 62 is tubular and interconnects with the hollow head 63 which in turn leads into the chemical supply line 64. Liquid chemical is drawn by suction on the upward stroke of plunger 62 through the passageway 77 and past the ball check 88 to fill the widened chamber 76 in the cylinder 54. At the same time, liquid chemical which has previously accumulated in the annular space 90 will be squeezed through the openings or ports 89 and upwardly through the tube 62 since the ball check 75 prevents return of the fluid into the chamber 76. On the down stroke of plunger 62, the ball check 88 will close and fluid in the large chamber 76 will be forced past the ball check 75 and upwardly into the tube 62 as well as through ports or openings 89 into the widening annular space 90. I prefer that the amount of liquid by-passed into annular space 90 be approximately equal to the amount of liquid which is forced upwardly through tube 62 on the down stroke of the plunger. With this arrangement, a two-stage pump arrangement is effected which will render the flow of liquid chemical through line 64 more even and will minimize the pulsation thereof into the mixer 21. It will be noted that my special O-ring seating arrangement for the ball checks 88 and 75 is extremely simple, and even when sediment and grit finds its way into the pump, it will work upwardly through the valves and not remain as a source of trouble as in the case of ordinary check valves. The chemical tube 64 is flexible since the plunger 62 is operably connected therewith and must necessarily reciprocate vertically together with the plunger.

It may thus be seen that I have devised a simple and efficient spray pump apparatus having novel adjustable stroke and pump mechanism which is trouble-free and can be quickly and easily inserted into a source of chemical supply with a minimum of effort.

It will, of course, be understood that various changes may be made in the form, details, arrangement and proportion of the various parts without departing from the scope of my invention.

What is claimed is:

1. A pump apparatus for spray equipment comprising, a supporting frame, a pump cylinder mounted on said supporting frame and adapted to communicate with a source of liquid spraying chemical, a plunger reciprocable within said cylinder for pumping fluid therethrough and having an outwardly terminating extension, a pivot link pivotally attached to the extension of said plunger, a radius arm pivotally secured to said pivot link in spaced relation to the pivot attachment to said extension, an adjustment arm pivotally attached to said radius arm in spaced relation with the pivot point between said radius arm and said link, and a reciprocable connecting rod attached to one of said radius arm and said pivot link for effecting reciprocation of the plunger upon corresponding reciprocation of the connecting rod.

2. A pump apparatus for spray equipment comprising, a supporting frame, a pump cylinder mounted on said supporting frame and adapted to communicate with a source of liquid spraying chemical, a plunger reciprocable within said cylinder for pumping liquid therethrough and having an outwardly terminating extension, a pivot link pivotally attached to the extension of said plunger, a radius arm pivotally secured to said pivot link in spaced relation to the pivot attachment to said extension, an adjustment arm pivotally attached to said radius arm in spaced relation with the pivot point between said radius arm and said link, said adjustment arm being movable to and away from a position where its pivotal connection with the radius arm is substantially in axial alignment with the pivotal connection between said link and said plunger.

3. A pump apparatus for spray equipment comprising, a supporting frame, a mount supported on said supporting frame, a pump cylinder secured on said mount and adapted to communicate with a source of liquid spraying chemical, a plunger reciprocable within said cylinder for pumping fluid therethrough and having an outwardly terminating extension, a pivot link pivotally attached to the extension of said plunger, a radius arm pivotally secured to said pivot link in spaced relation to the pivot attachment to said extension, an adjustment arm pivotally attached to said radius arm in spaced relation with the pivot point between said radius arm and said link, said adjustment arm being secured pivotally to said mount, and a reciprocable connecting rod attached to one of said radius arm and said pivot link for effecting reciprocation of the plunger upon corresponding reciprocation of the connecting rod, said mount being movable upwardly with respect to the supporting frame for carrying the entire pump assembly upwardly and out of engagement with the said source of liquid spraying chemical.

4. A pump apparatus for spray equipment comprising, a supporting frame, a mounting structure secured to the supporting frame, a variable stroke mechanism mounted on said mounting structure, and a piston pump mounted on the mounting structure and having a depending end portion adapted to be inserted in a container of liquid chemical secured to said supporting frame, said mounting structure being swingable upwardly on the supporting frame for replacing said container with a new container of liquid chemical and for lowering thereof to permit insertion of the depending pump portion within the container.

5. A wheeled apparatus for traveling over the terrain and spraying plants growing thereon comprising, a supply line for delivering carrying fluid, spaced nozzles for overlying the terrain during operation of the apparatus, means for supplying carrying fluid under substantially constant pressure from said supply line to said nozzles to deliver the carrying fluid at a substantially continuous and controlled manner through said nozzles, a mounting structure on said apparatus, a pump assembly mounted on said mounting assembly, said mount being reciprocable upwardly and downwardly for removing and inserting said pump assembly into a source of liquid chemical, and a drive mechanism interconnecting said apparatus with the pump assembly for driving thereof at a rate proportional to the rate of travel of said wheeled apparatus.

6. A wheeled apparatus for traveling over the terrain and spraying plants growing thereon comprising, a supply line for delivering carrying fluid, spaced nozzles for overlying the terrain during operation of the apparatus, means for supplying carrying fluid under substantially constant pressure from said supply line to said nozzles to deliver the carrying fluid at a substantially continuous and controlled manner through said nozzles, a mounting structure pivotally secured to said apparatus for vertical movement, a pump assembly having a depending inlet portion mounted on said mounting structure, and a variable stroke mechanism mounted on said mounting structure and adapted to apply reciprocation to said pump, said mounting structure being adapted to move upwardly away from a source of liquid chemical on said apparatus for replacement thereof and for re-establishing fluid connection therewith upon lowering of the mounting structure.

References Cited in the file of this patent

UNITED STATES PATENTS

| | | |
|---|---|---|
| 1,539,556 | Garber | May 26, 1925 |
| 2,044,064 | Dake | June 16, 1936 |
| 2,303,597 | Adelson | Dec. 1, 1942 |
| 2,340,020 | Roose | June 25, 1944 |
| 2,475,686 | Anderson | July 12, 1949 |
| 2,563,939 | Kiskline | Aug. 14, 1951 |
| 2,657,091 | Quarles | Oct. 27, 1953 |